(12) United States Patent
Fischer

(10) Patent No.: US 7,657,512 B2
(45) Date of Patent: Feb. 2, 2010

(54) SOURCE-CONTEXT AWARE OBJECT-BASED NAVIGATION

(75) Inventor: Ilja Fischer, Bad Schoenborn (DE)

(73) Assignee: SAP AG, Walldorf (DE)

( * ) Notice: Subject to any disclaimer, the term of this patent is extended or adjusted under 35 U.S.C. 154(b) by 112 days.

(21) Appl. No.: 11/319,416

(22) Filed: Dec. 29, 2005

(65) Prior Publication Data

US 2007/0156649 A1 Jul. 5, 2007

(51) Int. Cl.
*G06F 17/30* (2006.01)
(52) U.S. Cl. .................... 707/3; 707/10; 705/1
(58) Field of Classification Search .......... 707/2, 707/3, 9, 10; 705/1
See application file for complete search history.

(56) References Cited

U.S. PATENT DOCUMENTS

| | | | |
|---|---|---|---|
| 6,418,439 B1 * | 7/2002 | Papierniak et al. ............. | 707/9 |
| 6,598,046 B1 * | 7/2003 | Goldberg et al. ............... | 707/5 |
| 7,100,195 B1 * | 8/2006 | Underwood ................... | 726/2 |
| 7,113,923 B1 | 9/2006 | Brichta et al. ................ | 705/35 |
| 2001/0049615 A1 * | 12/2001 | Wong et al. .................... | 705/8 |
| 2002/0069081 A1 * | 6/2002 | Ingram et al. .................. | 705/1 |
| 2003/0182394 A1 * | 9/2003 | Ryngler et al. .............. | 709/217 |
| 2003/0229522 A1 * | 12/2003 | Thompson et al. ............. | 705/4 |
| 2003/0237044 A1 * | 12/2003 | Hayer et al. ............. | 715/501.1 |
| 2004/0019696 A1 * | 1/2004 | Scott et al. ................... | 709/242 |
| 2004/0083367 A1 * | 4/2004 | Garg et al. ................... | 713/170 |
| 2004/0122826 A1 * | 6/2004 | Mackie ....................... | 707/100 |
| 2004/0148409 A1 * | 7/2004 | Davis et al. ................. | 709/229 |
| 2004/0181795 A1 * | 9/2004 | Kol et al. .................... | 719/316 |
| 2005/0027696 A1 * | 2/2005 | Swaminathan et al. ......... | 707/3 |
| 2005/0076311 A1 * | 4/2005 | Kusterer et al. ............. | 715/853 |
| 2005/0114435 A1 * | 5/2005 | DiPlacido et al. ........... | 709/202 |
| 2005/0223310 A1 * | 10/2005 | Wachholz-Prill et al. . | 715/501.1 |
| 2005/0283463 A1 * | 12/2005 | Dill et al. ....................... | 707/2 |
| 2005/0283642 A1 * | 12/2005 | Dill .............................. | 714/4 |
| 2006/0069666 A1 * | 3/2006 | Burke et al. ................... | 707/2 |
| 2006/0089932 A1 | 4/2006 | Buehler et al. ................ | 707/9 |
| 2006/0230066 A1 * | 10/2006 | Kosov et al. ............. | 707/104.1 |
| 2006/0259367 A1 * | 11/2006 | Sattler et al. .................. | 705/26 |
| 2007/0022086 A1 * | 1/2007 | Elsholz ......................... | 707/1 |
| 2007/0174113 A1 * | 7/2007 | Rowen ........................ | 705/14 |

* cited by examiner

*Primary Examiner*—Charles Rones
*Assistant Examiner*—Phuong-Thao Cao
(74) *Attorney, Agent, or Firm*—Kenyon & Kenyon LLP

(57) ABSTRACT

The present invention provides methods and systems for allowing object-based navigation between business objects and applications where the target application is specific to the use context in which the user selects a navigation element. Context criteria on which the target view depends include the source business object, the user's role, and the source application.

17 Claims, 7 Drawing Sheets

SOURCE-CONTEXT AWARE OBJECT-BASED NAVIGATION

BACKGROUND

Object-based navigation (OBN) is a way of navigating between components of a complex system, such as a business management system. In such a system, a user accesses functions and components of the system via applications that display instances of business objects. As a specific example, an application provides a user access to an order management system, where selecting a field or other navigation element displayed in an instance of a business object, such as a customer, order, or contract, allows a user to view and manipulate information about that business object instance. By accessing an instance of a business object via an application, a user manipulates information stored in a business object, for example by viewing and modifying outstanding orders within an instance of a sales orders business object.

Generally, when a user selects a field in a business object instance, the user navigates to a different application. The target application displays other instances of business objects, where the instances and business objects displayed are the same or different than those displayed in the first business object. FIG. 1 shows a navigation process in a system implementing object-based navigation. A source business object instance 120 within a source application 110 may display fields 121 and 122. These fields may be, for example, customer names, account numbers, or other information. Each field may be a business object instance. When a user selects a field 122, he may navigate to a target application 150. A field or instance of a business object may be displayed in multiple views and applications. A field displayed in an application may be an instance of a business object, or it may be part of the business object instance displayed by the application. In FIG. 1, a second source application 130 is shown that provides user access to a second business object instance 140. The second business object instance 140 may display fields 141 and 122. The applications 110 and 130 may be the same applications, with the business object instances 120 and 140 being different, or the applications 110 and 130 may be different applications and the business object instances 120 and 140 instances of the same business object. Similarly, instances of different business objects may display some of the same fields. For example, in FIG. 1 the business object instances 120 and 140 may both display the same field or instance 122.

When a user selects a field displayed in a business object instance, he may navigate to a new application, business object, or both. In FIG. 1, when a user selects a field 122 in the first source application 110, he navigates to a target application 150 displaying an instance of a target business object 160. The target business object may also display fields 161, 162 allowing for further navigation. As shown in FIG. 1, a user will navigate to the same target application 150 regardless of the context in which the field 122 linked to the target application 150 is selected. That is, the source applications 110 and 130 and source business object instances 120 and 140 may be very different applications or business objects semantically, but the same target application 150 and target object instance 160 are displayed regardless.

As described above, in an object-based navigation system the target application is the same regardless of the context in which the field was selected. There is therefore a need for a system and method allowing for navigation to different applications in an OBN system based on the context in which a field is selected.

DETAILED DESCRIPTION

The present invention provides a method for allowing object-based navigation between business object instances where the target application is specific to the source business object, user role, and source application. An application such as a sales management application may display a business object instance having fields or other navigation elements that a user can select to navigate to a target application using object-based navigation. One of the means by which this navigation can occur is through specific program instructions contained on a machine-readable medium that are executed on a processor. The source (first) business object and/or application may be the same as the target business object and/or application, or it may be different. According to the present invention, the target application may be determined based on the source business object, the user's role, and the source application.

Figure 1:
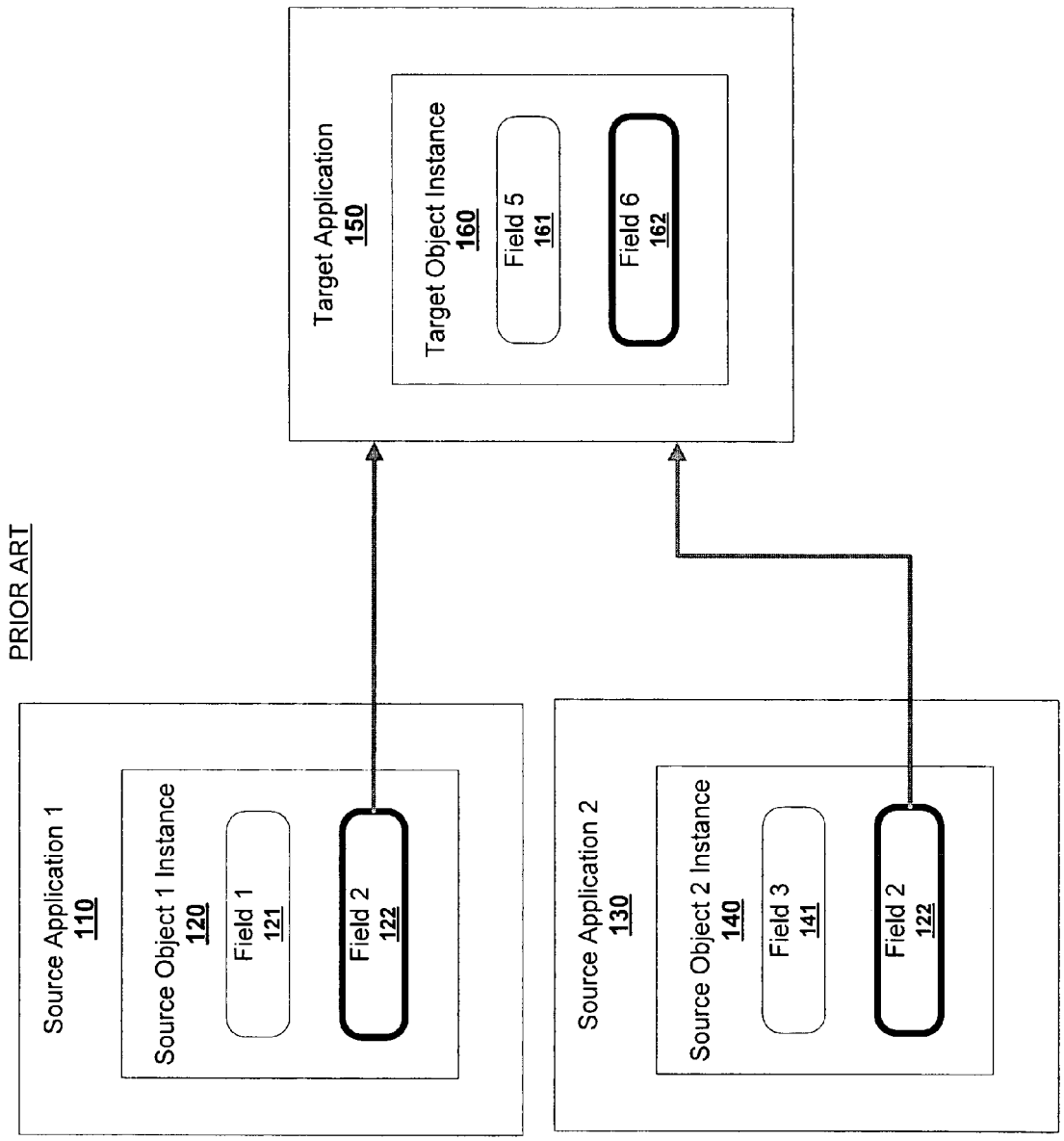
FIG. 1 is a block diagram illustrating a conventional object-based navigation between business object instances in applications.
Figure 2:
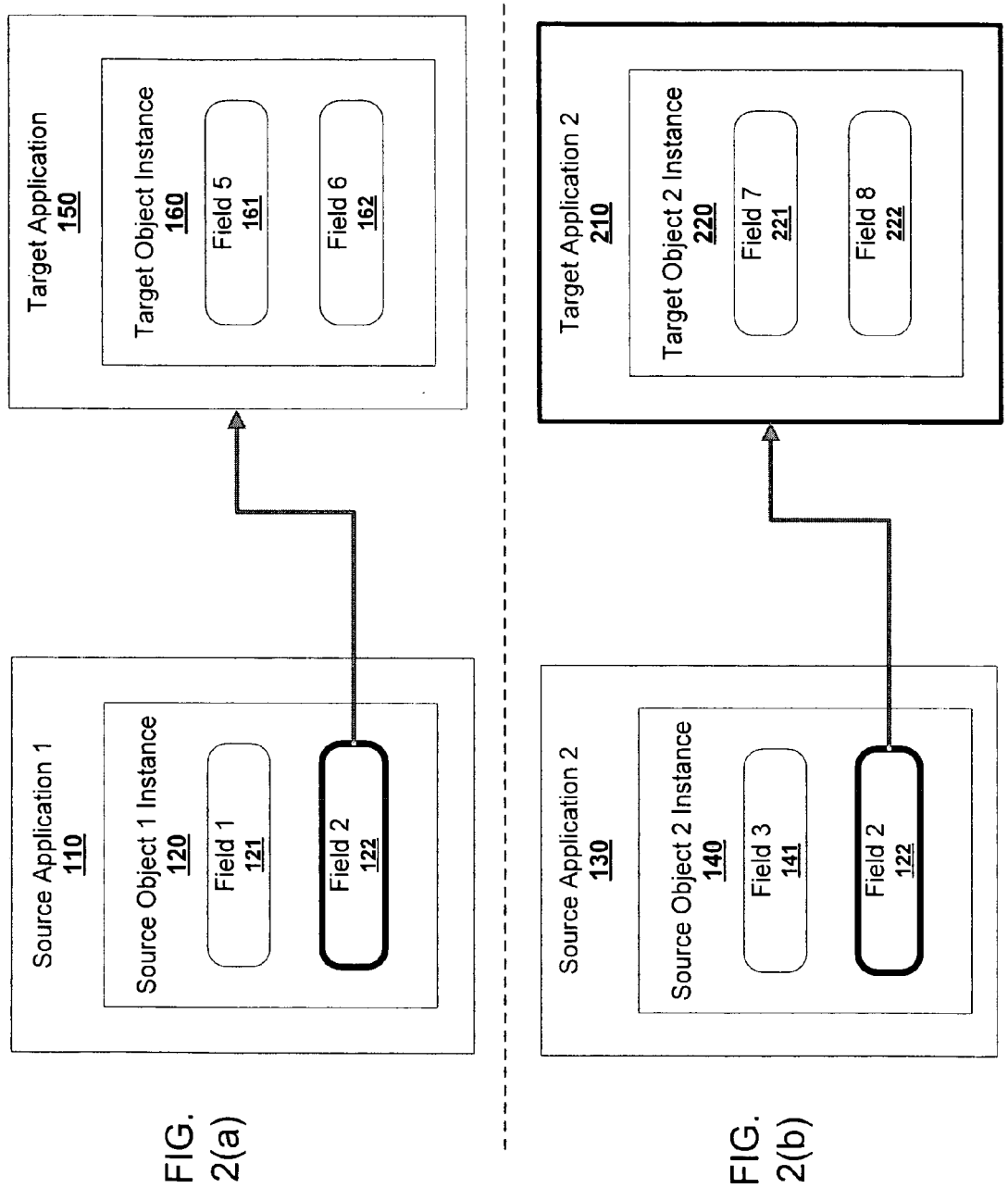
FIG. 2 is a block diagram illustrating object-based navigation between business object instances in applications according to an embodiment of the invention.

FIG. 2 shows an example of object-based navigation according to the present invention. A navigation where a user selects a navigation element 122 is shown in FIG. 2(a). A similar navigation, where the user selects the same navigation element 122 within a different source application and/or source view is shown in FIG. 2(b). The navigation elements may be hyperlinks displayed in a web page, instances of business objects, or any other appropriate field. The target application to which the user is directed may be based on the use context in which the user initiated the navigation. The use context may be determined by relationships between elements such as the application 110 or 130 which the user was accessing when the field 122 was selected, the user's role in the system, and the business object represented by the business object instance 120 and 130 displaying the field used for navigation 122. Other criteria may also be used to determine the target application. Thus, Source Application 1 (110) and Source Application 2 (130) may be the same application with Source Object 1 Instance 120 and Source Object 2 Instance 140 being instances of different business objects. For example, the source applications 110 and 130 may both be a customer relations management application, with Source Object 1 Instance 120 being an instance of a customer information business object, and Source Object 2 Instance 140 being an instance of an invoicing business object. Similarly, the source applications 110 and 130 may be different applications displaying instances of the same business object 120 and 140. As an example, a user accessing an instance 120 of a business object from a customer relations application 110 may be directed to a different target application 150 than a user accessing an instance 140 of the same business object from within a resource management application 130. The target application 150 or 210 to which the user navigates may be pre-determined by a user or system developer to be the application most related to the source application and source business object.

Figure 3:
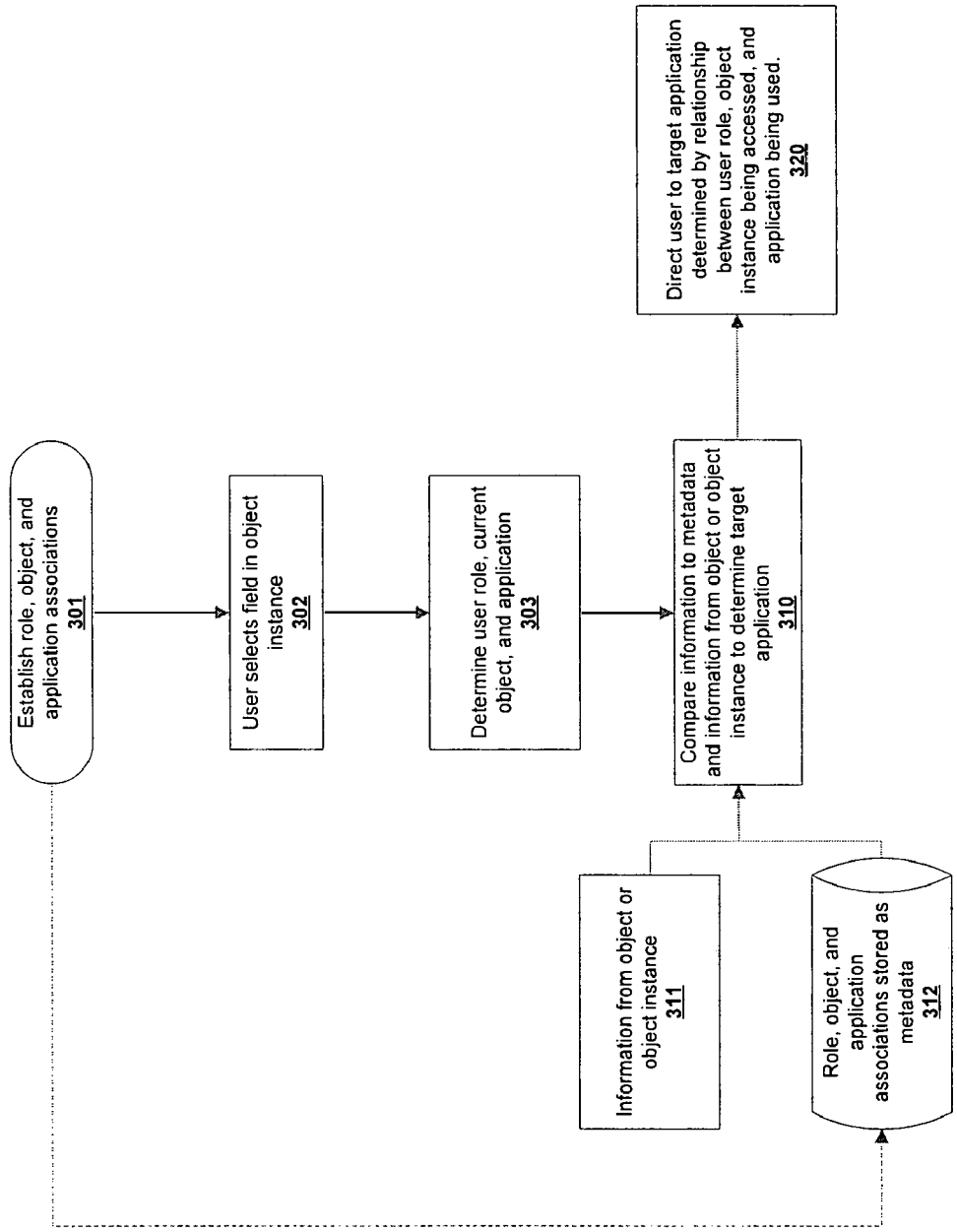
FIG. 3 is a flowchart illustrating a navigation process according to an embodiment of the invention.

FIG. 3 shows an exemplary navigation process. A set of relationships between criteria such as user roles, objects, and applications may be created at the time a system is designed 301. Each relationship may specify a target application for one or more of the criteria. These relationships may be stored as business object metadata 312, or they may be stored in an external system such as a database. When a user selects a field in an object instance 302, the system may determine a use context to access the business object 303. This information may then be compared 310 to the previously-created metadata 312, as well as information that may be sent by the business object or object instance being accessed by the user 311. Thus use context may be represented by a user's current role, the business object being accessed, and/or the application used. The user may then be directed to a target application that is appropriate to the user's role, the business object being accessed, and/or the application being used 320. Other contextual data may also be used to determine the target application.

Figure 4:
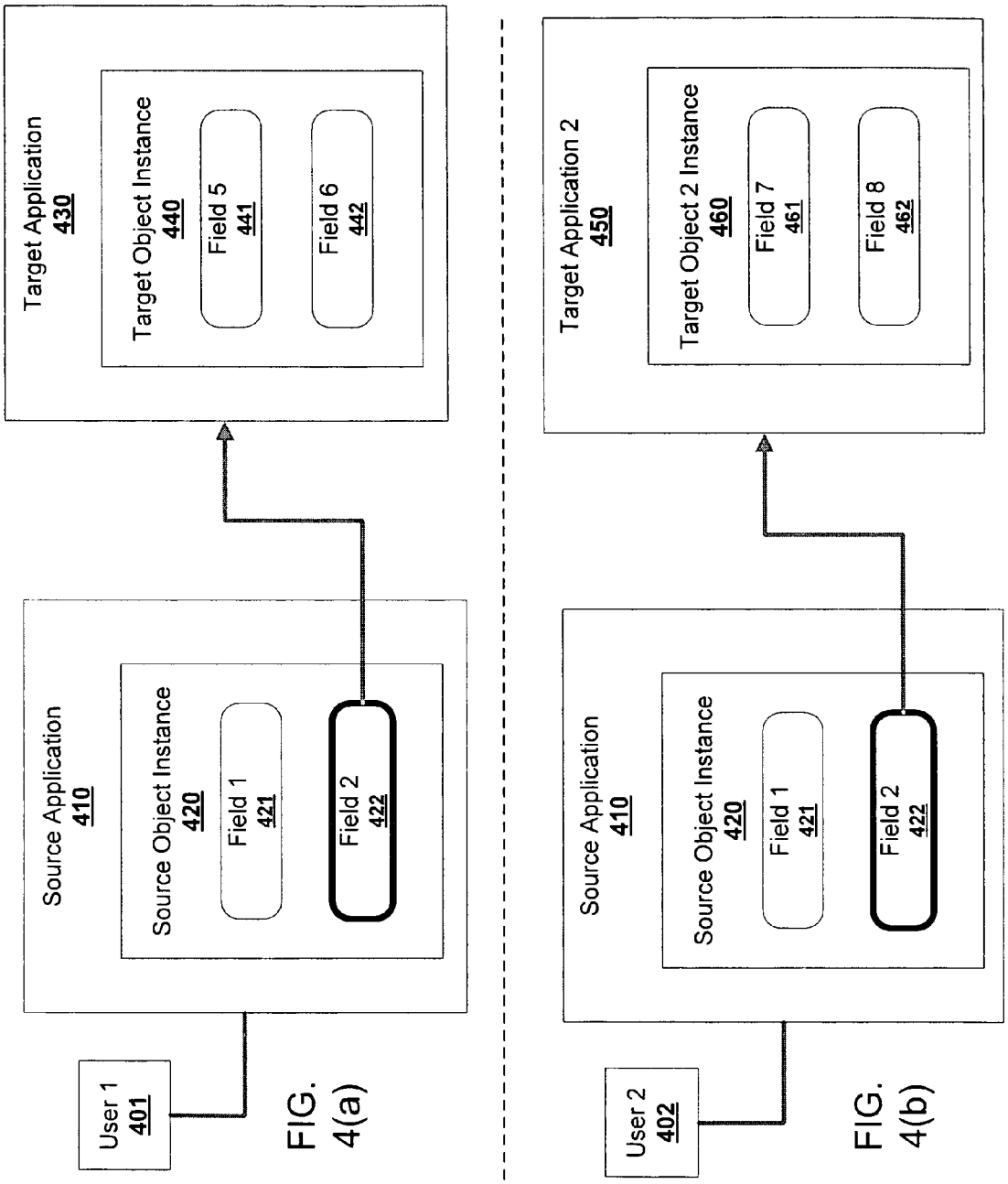
FIG. 4 is a block diagram illustrating object-based navigation between business object instances in applications according to an embodiment of the invention.

FIG. 4 shows an example of a user navigation where the user may be directed to different target applications depending on the user's role. In the example shown in FIG. 4, two users having different roles may access the same business object instance within the same application. For example, one user 401 may be a user who has been given rights or privileges in the system allowing modification of customer orders, while another user 402 may have rights to view customer financial information. FIG. 4(*a*) shows a navigation by the first user 401 after selecting a navigation element 422. FIG. 4(*b*) shows a similar navigation by the second user 402 after selecting the same navigation element 422.

When each user 401 and 402 accesses a business object instance 420 from within a source application 410, the same fields 421 and 422 may be displayed. The navigation elements may be hyperlinks, business object instances, or other appropriate fields. Each user may be directed to a different target application 430 or 450 when a field 422 is selected. For example, the first user 401 may be directed to a target application having an object instance 440 with fields 441 and 442 that allow for the user 401 to modify customer orders. The second user 402 may be directed to a different target application 450 having an object instance 460, that displays fields 461 and 462 allowing the user to view the same customer's financial information. Other rules may be used, such as rules placing users into groups based on their roles. For example, a user in a human resources department may be assigned different privileges and rights in the system, and therefore have a different role, than a user in a customer relations department. The system may direct users to different target applications based on their roles in conjunction with the source business object and application being accessed, as previously discussed.

Figure 5:
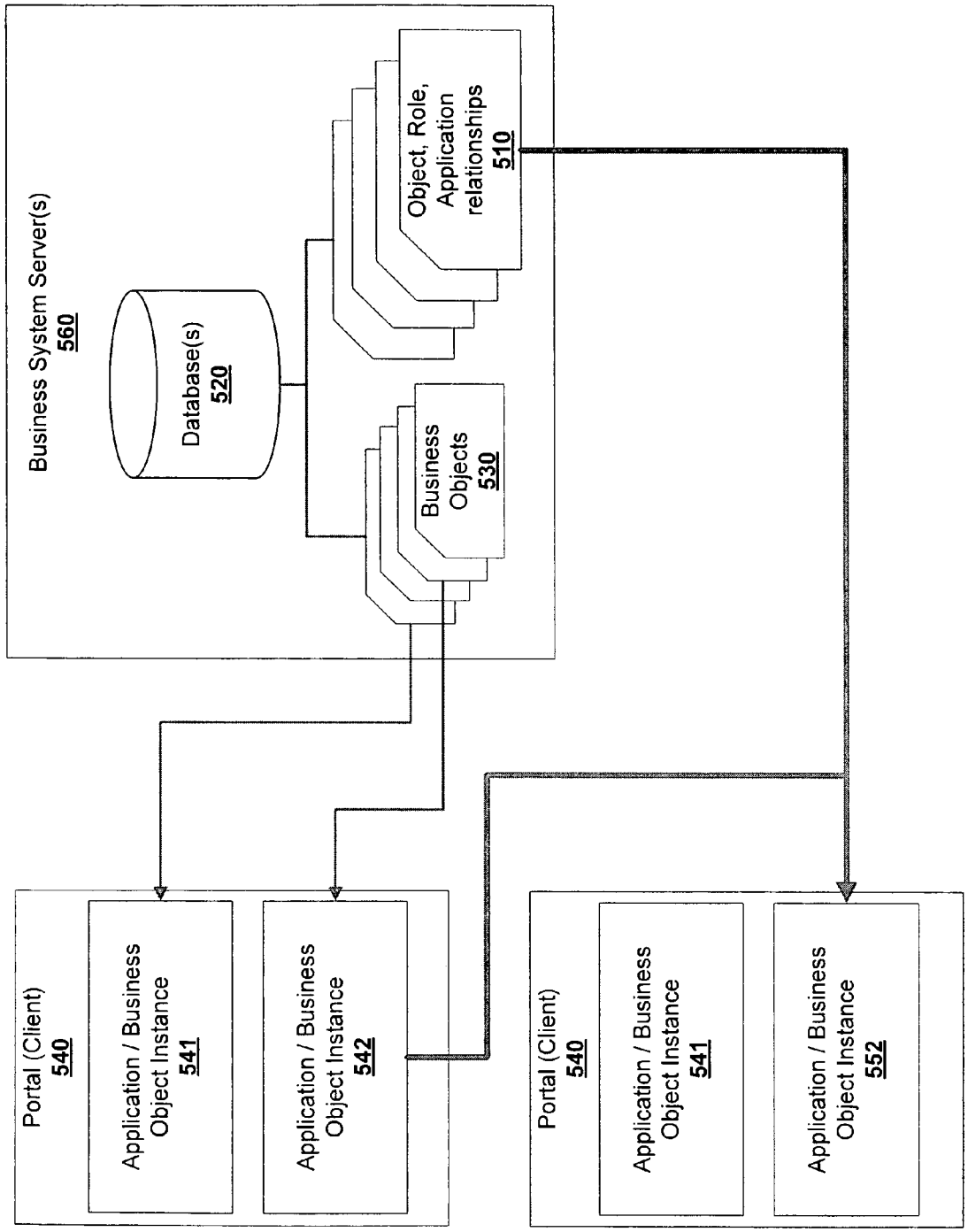
FIG. 5 shows a system implementing object-based navigation according to an embodiment of the invention.

The relationships between roles, applications, and business objects may be stored as metadata in the business objects, or they may be stored separately, such as in a database. When a user selects a navigation element, a system according to the present invention may select a relationship from among the stored relationships that matches the user's role, the business object being accessed, and the application being used to access the business object. An example of such a system is illustrated in FIG. 5. A business system 560 may store multiple business objects 530, which may contain a set of relationships 510 describing navigation targets for pairings of user roles, applications, and business objects. The relationships 510 may be stored in metadata of the business objects 530, or they may be stored elsewhere in the business system 560 such as a database 520. A user may view one or more applications 541, 542, and 552 via a portal 540. The portal 540 may reside on the user's client computer or application; the business system 560 may run on or contain one or more servers. Each application may display instances of one or more business objects. Similarly, the application may display only an instance of a single business object. Each business object or application may present navigation options to the user. For example, a business object displayed in an application may allow the user to select a navigation element such as a field displayed in the business object in order to view a different business object. When a user selects a navigation element, for example by selecting a field in a business object instance 542, the system may consult the relationships 510 stored in the system to determine an appropriate target for the navigation. The portal 540 may then display the application or business object 552 described by the appropriate relationship. The relationships 510 may be previously defined by a user, for example when the navigation possibilities of the business system 560 are designed.

Figure 6:
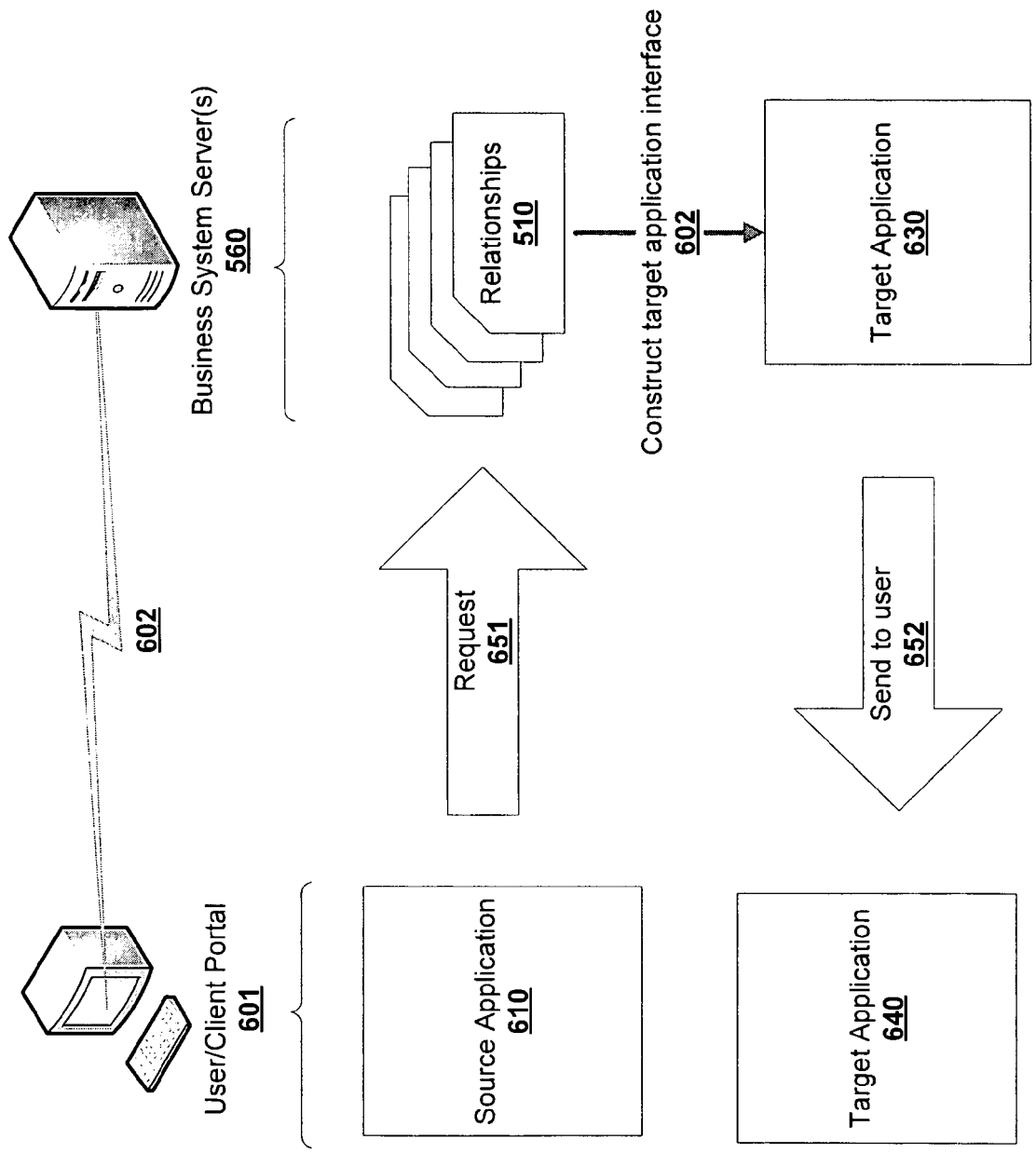
FIG. 6 shows a system implementing object-based navigation according to an embodiment of the invention.

FIG. 6 shows an example system implementing object-based navigation according to an embodiment of the present invention. A user may access one or more servers in the business system 560 via a communication network 602. The topology, architecture, and related protocols of the communication network 602 are immaterial to the present invention unless otherwise specified herein. A user may perform operations within the business system by accessing one or more applications 610 through a client portal 601. The applications may be stored and executed on the servers forming the business system 560, with an interface being transmitted to the user. For example, the application interfaces 610, 640 may be web pages that are transmitted to a web browser running on the client computer in response to actions and navigations performed by the user. In such an embodiment, the application views 610, 640 may be constructed as web pages by the business system server or servers and transmitted to the user. When a user selects an element such as a business object instance or a navigation element in a source application 610, a request may be transmitted (651) to the business system 560. The business system may then compare contextual criteria, such as the user's role, a business object being accessed from the source view 620, and the source application 610 used, to a set of relationships 510. Each relationship 510 may specify a target application for a combination of a user role, a source application, and a source business object. The relationship may specify each criteria, or it may specify only one or some of the criteria. Based on these relationships, the business system 560 may construct (602) a target application interface 630 having business object instances, information, and navigation elements appropriate to the contextual criteria. The business system may then transmit (652) this interface to the client portal, where it may be displayed within the portal 601.

Figure 7:
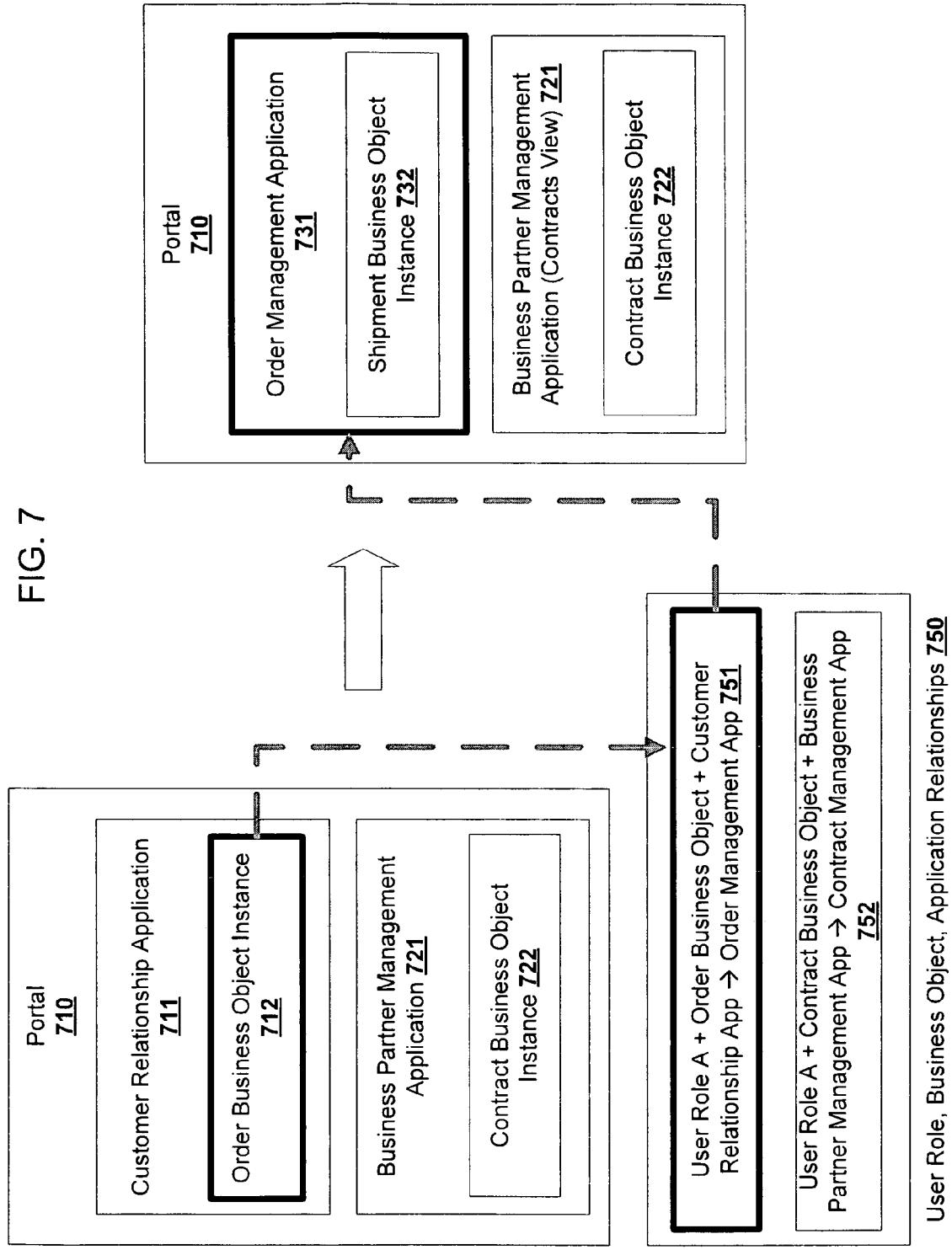
FIG. 7 shows a non-limiting example navigation according to an embodiment of the invention.

For purposes of illustration, a specific non-limiting example of a navigation according to an embodiment of the present invention is shown in FIG. 7. A user having a User Role "A" may access applications 711, 721 via a portal 710. Each application may display navigation elements, system information, business object instances, and other data and structures. The application may be accessible via an application interface, such as a web page transmitted to the portal by a business system. The application interfaces 711, 721 may display a specific set of business object instances (712 and 722, respectively) and other data. A user may navigate to a different application by selecting an element in the application interface. In FIG. 7, when the user selects the Order Business Object Instance 712, the Order Management Application 731 is opened in the portal 710. The selection of the Order Business Object Instance 712 may be made by selecting the instance directly, or it may be made by selecting a specific field or other navigation element within the portal. For example, if the portal 710 is a web browser that displays application interfaces 711 and 721 in different frames, the Order Business Object Instance 712 may be represented by a hyperlink displayed in the frame containing the Customer Relationship Application 711. The system may consult predefined relationships 750 in order to determine the appropriate target application 731 to open in the portal.

The relationships 750 may specify target applications for different combinations of user roles, business objects, and/or applications as previously described. For purposes of illustration, the example in FIG. 7 does not show all possible combinations of user roles, business objects, and applications. Thus relationships other than those shown, such as relationships that specify different target applications for different user roles, may be defined. A relationship 751 matching the user role, the business object accessed, and/or the application may be selected by the system in order to determine a view of the target application to display. In the example shown, the matching relationship indicates that a selection of the Order Business Object 712 from the Customer Relationship Application 711, by a user with a User Role A, assigns the Order Management Application 731 as the target application. The Order Management Application 731 may be the application that a user or system developer previously indicated is most related to the selection made by the user. The target application may be displayed in the portal 710 from which the user accessed the source application 711. For example, if the portal 710 is a web browser displaying application interfaces in frames, the Order Application 731 may be displayed in the frame that previously displayed the Customer Relationship Application 711. Similarly, the Order Application 731 may be loaded in a separate frame or window of the browser. The target application may contain additional business object instances 732, other navigation elements, and other appropriate data.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A computer-implemented context aware navigation method for portal sessions, comprising, at a server computer running an operating system:
   for each business object, establishing a plurality of relationships associating the business object, different user roles, and different source applications to different target applications;
   storing the plurality of relationships for each business object in the respective business object;
   establishing a portal session with a client computer through a web browser running on the client computer;
   initiating a source application in the portal session through the web browser, the source application being a computer program designed to assist in performing a first task, the source application containing a source business object and a navigation element;
   receiving a resource request from the client computer representing user interactivity with the navigation element in the source application, the resource request including information identifying the source business object;
   retrieving a role of a user initiating the resource request, the role specifying a data access right of the user;
   retrieving information identifying the source application;
   comparing the role of the user, the source application, and the source business object to the stored plurality of relationships in the source business object;
   identifying the target application in the stored relationship having the matching source business object, source application, and user role, the target application being a second program designed to assist in performing a second task where the resource request is common across different source applications but the target application specified in the stored plurality of relationships changes for different source applications, user roles, and source business objects;
   generating a new portal page containing data from the target application, the data containing data authorized by the data access right of the user in the user role; and
   transmitting the page to the client.

2. The computer-implemented method of claim 1, wherein the information identifying the source application is retrieved from the resource request after it is received.

3. The computer-implemented method of claim 1, wherein the target application is the same application as the source application, and the new portal page is a new view of the target application.

4. The computer-implemented method of claim 1, wherein the target application is a different application than the source application.

5. The computer-implemented method of claim 1, wherein the new portal page is constructed according to one or more relationships stored in business object metadata.

6. An article of manufacture containing a machine-readable medium storing a plurality of instructions which, when executed by a processor, cause the processor to perform a method comprising, at a server computer running an operating system:
   for each business object, establishing a plurality of relationships associating the business object, different user roles, and different source applications to different target applications;
   storing the plurality of relationships for each business object in the respective business object;
   establishing a portal session with a client computer through a web browser running on the client computer;
   initiating a source application in the portal session through the web browser, the source application being a computer program designed to assist in performing a first task, the source application containing a source business object and a navigation element;
   receiving a resource request from the client computer representing user interactivity with the navigation element in the source application, the resource request including information identifying the source business object;
   retrieving a role of a user initiating the resource request, the role specifying a data access right of the user;
   retrieving information identifying the source application;
   comparing the role of the user, the source application, and the source business object to the stored plurality of relationships in the source business object;

identifying the target application in the stored relationship having the matching source business object, source application, and user role, the target application being a second program designed to assist in performing a second task where the resource request is common across different source applications but the target application specified in the stored plurality of relationships changes for different source applications, user roles, and source business objects, generating a new portal page containing data from the target application, the data containing data authorized by the data access right of the user in the user role; and transmitting the page to the client.

7. The article of manufacture of claim 6, wherein the information identifying the source application is retrieved from the resource request after it is received.

8. The article of manufacture of claim 6, wherein the target application is the same application as the source application, and the new portal page is a new view of the target application.

9. The article of manufacture of claim 6, wherein the target application is a different application than the source application.

10. The article of manufacture of claim 6, wherein the information identifying the role of the user is retrieved from the resource request after it is received.

11. The article of manufacture of claim 6, wherein the information identifying the role of the user is retrieved from a machine-readable memory.

12. A portal navigation system comprising a server computer running an operating system, the server computer configured to:

for each business object, establish a plurality of relationships associating the business object, different user roles, and different source applications to different target applications;

store the plurality of relationships for each business object in the respective business object;

establish a portal session with a client computer through a web browser running on the client computer;

initiate a source application in the portal session through the web browser, the source application being a computer program designed to assist in performing a first task, the source application containing a source business object and a navigation element;

receive a resource request from the client computer representing user interactivity with the navigation element in the source application, the resource request including information identifying the source business objects;

retrieve a role of a user initiating the resource request, the role specifying a data access right of the user;

retrieve information identifying the source application;

compare the role of the user, the source application, and the source business object to the stored plurality of relationships in the source business object;

identify the target application in the stored relationship having the matching source business object, source application, and user role, the target application being a second program designed to assist in performing a second task where the resource request is common across different source applications but the target application specified in the stored plurality of relationships changes for different source applications, user roles, and source business objects;

generate a new portal page containing data from the target application, the data containing data authorized by the data access right of the user in the user role; and transmit the page to the client.

13. The system of claim 12, wherein the information identifying the source application is retrieved from the resource request after it is received.

14. The system of claim 12, wherein the target application is the same application as the source application, and the new portal page is a new view of the target application.

15. The system of claim 12, wherein the target application is a different application than the source application.

16. The system of claim 12, wherein the information identifying the role of the user is retrieved from the resource request after it is received.

17. The system of claim 12, wherein the information identifying the role of the user is retrieved from a machine-readable memory.

* * * * *